May 29, 1934.  L. A. LEMAITRE ET AL  1,961,004
PRESSURE CONTROLLED SWITCH
Filed Feb. 10, 1932
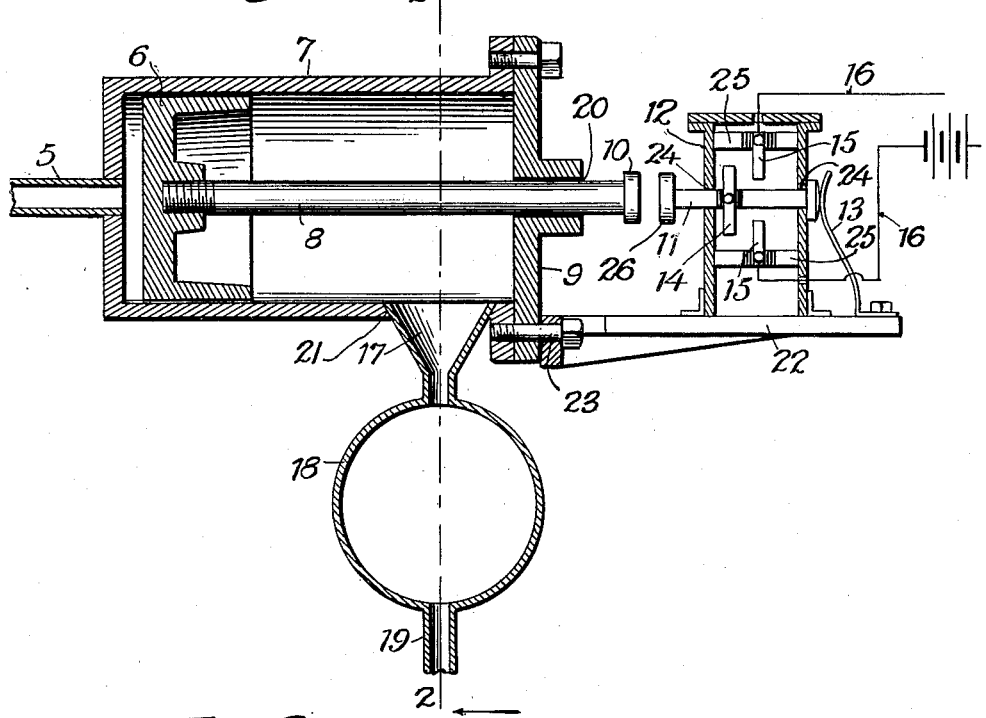
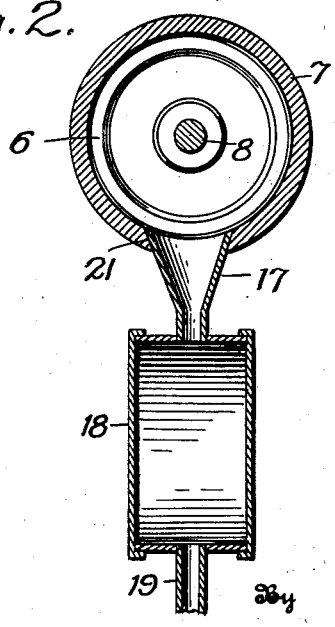
Inventor
Leon A. Lemaitre
Joseph Rassa
Frederick A. Kling
Attorney Patented May 29, 1934

1,961,004

UNITED STATES PATENT OFFICE 1,961,004

PRESSURE CONTROLLED SWITCH

Leon A. Lemaitre and Joseph Rassas, Long Branch, N. J.

Application February 10, 1932, Serial No. 592,110

2 Claims. (Cl. 200—82)

This invention relates to pressure controlled switches and more particularly to switches adopted for the automatic control of the ignition circuit and the lubricating system of internal combustion engines.

It has for its object the closing of the ignition circuit when a pressure is created in the lubricating system of the engine and opening the circuit when the oil supply is exhausted or the oil pump fails.

Also to delay the closing of the circuit until the engine gains sufficient speed to prevent back firing when hand cranking is resorted to, which often results in serious injury to the operator.

It is desirable, when the oil supply is exhausted or the oil pump fails to function, to break the circuit through the ignition plugs of the engine as damage may result to the bearings or other parts thereof from the failure of the pump to supply lubricant thereto.

With these and other objects more fully set forth in the following specification, defined in the appended claims and illustrated in the accompanying drawing in which:

Fig. 1 is a vertical section through the device;

Fig. 2 a section on line 2—2 of Fig. 1.

In the drawing a cylinder 7 is connected by means of a pipe 5 to the usual oil pressure gauge mounted on the instrument board of a motor vehicle. A piston 6 is loosely mounted in the cylinder to permit a leakage between it and the wall of the cylinder and has secured thereto a rod 8 which projects through an opening 20 in the cylinder closure 9. By spacing the piston from the cylinder wall the oil that escapes past the piston forms a film of lubricant around the piston head which reduces friction and provides for a more sensitive operation of the device. To further reduce friction in the operation of the piston, the opening 20 is of sufficient area to permit the piston rod to slide freely therethrough.

To prevent the escape of oil that has leaked past the piston through the opening 20, an opening 21 is formed in the lower part of the cylinder to which the flared end 17 of an oil return pipe 19 is connected. The pipe 19 is also provided with an oil trap 18 from which it extends to the crank case of the engine to return the oil thereto.

A switch box 12 is mounted upon a base 22 which is supported on the cylinder closure 9 by suitable means such as one or more bolts 23.

Rod 11 is slidably mounted in openings 24 in the switch box and carries a conductor 14 insulated therefrom which is adapted to bridge contacts 15 interposed in the ignition circuit and secured to non-conducting supports 25 mounted within the switch housing.

When the engine starter is set in operation or the engine is cranked manually, the oil pump forces oil under pressure through the lubricating system thus creating a pressure in the pipe 5 against the head of the piston 6 which moves rearwardly whereby the head 10 on the piston rod after a slight movement engages the head 26 on the switch rod 11 and moves the rod and conductor 14 to bridge the contacts 15. This operation completes the ignition circuit whereupon the engine starts to operate and continues to do so as long as the oil pump creates a pressure in the lubricating system.

When the oil pressure fails, due to the failure of the oil pump or the exhaustion of the oil supply, a spring 13 secured to the base 22 and bearing against the opposite end of the switch rod, moves it forwardly to disengage the conductor from the contacts 15 and break the circuit whereupon the engine ceases to operate.

The switch is preferably interposed between the ignition coil and the distributor and forms an effective means for holding the circuit open while the engine is idle, even though the usual key operated switch is in the "on" position until the engine is either cranked or turned over by the starter.

The leakage of oil past the piston necessitates the engine attaining sufficient speed before enough pressure is built up in the cylinder to cause the piston to close the circuit. As it is necessary, therefore, for the engine to attain a certain speed before the circuit is closed through the ignition plugs there is less danger of backfiring. This construction obviates the necessity of packing the piston or piston rod which permits a more sensitive operation of the device.

By providing a space between the piston rod and switch rod the piston has gained sufficient momentum by the time it engages the switch rod to cause a rapid closing of the switch which prevents arcing and reduces to a minimum the danger of fire.

The switch housing is spaced from the cylinder and its related elements so that oil in the cylinder is prevented from entering the housing thereby fouling the contacts and constituting a serious fire hazard.

In effect the space between the cylinder and piston is normally sealed by the oil and the piston is practically suspended by the escaping oil.

Having described our invention and set forth its merits, what we claim is:

1. A fluid actuated switch operating mechanism, comprising a cylinder, a piston in said cylinder, a piston rod secured to the piston and positioned to engage a switch member spaced from said cylinder; said cylinder having a pressure inlet at one end and a discharge port at the opposite end, the piston being positioned between the inlet and discharge ports of the cylinder, and peripherally spaced from the cylinder wall sufficiently to permit a constant proportional discharge of fluid past the piston to control operation of the switch.

2. A fluid actuated switch operating mechanism, comprising a cylinder, a piston in said cylinder, a piston rod secured to the piston and positioned to engage a switch member spaced from said cylinder; said cylinder having a pressure inlet at one end and a discharge port at the opposite end, the piston being positioned between the inlet and discharge ports of the cylinder, and peripherally spaced from the cylinder wall sufficiently to permit a constant proportional discharge of fluid past the piston, said piston rod passing freely through the end wall of the cylinder to lessen frictional contact between the end wall and piston rod.

LEON A. LEMAITRE.
JOSEPH RASSAS.